US011827223B2

(12) United States Patent
Williams et al.

(10) Patent No.: US 11,827,223 B2
(45) Date of Patent: Nov. 28, 2023

(54) SYSTEMS AND METHODS FOR INTERSECTION MANEUVERING BY VEHICLES

(71) Applicant: GM GLOBAL TECHNOLOGY OPERATIONS LLC, Detroit, MI (US)

(72) Inventors: Benjamin L. Williams, South Lyon, MI (US); Ryan Martini, Wolverine Lake, MI (US); Constandi J. Shami, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/218,251

(22) Filed: Mar. 31, 2021

(65) Prior Publication Data

US 2022/0314999 A1 Oct. 6, 2022

(51) Int. Cl.
*B60W 30/18* (2012.01)
*G08G 1/07* (2006.01)
*B60W 40/08* (2012.01)
*B60W 60/00* (2020.01)

(52) U.S. Cl.
CPC ...... *B60W 30/18154* (2013.01); *B60W 40/08* (2013.01); *B60W 60/001* (2020.02); *G08G 1/07* (2013.01); *B60W 2540/10* (2013.01)

(58) Field of Classification Search
CPC ......... B60W 30/18154; B60W 60/001; B60W 40/08; B60W 2540/10; G08G 1/07
See application file for complete search history.

(56) References Cited

U.S. PATENT DOCUMENTS

| 10,181,264 | B2 * | 1/2019 | MacNeille | H04W 4/46 |
| 10,733,883 | B1 * | 8/2020 | Bauer | G08G 1/096783 |
| 11,192,549 | B2 * | 12/2021 | Lanfranco | G06V 20/584 |
| 2010/0305804 | A1 * | 12/2010 | Taguchi | G06F 7/00 |
| | | | | 701/31.4 |
| 2012/0146811 | A1 * | 6/2012 | Chou | G08G 1/096783 |
| | | | | 340/905 |

(Continued)

FOREIGN PATENT DOCUMENTS

EP 4024366 A1 * 7/2022

*Primary Examiner* — Hussein Elchanti
(74) *Attorney, Agent, or Firm* — Lorenz & Kopf LLP

(57) ABSTRACT

Systems and method are provided for controlling a vehicle. In one embodiment, method includes: receiving, via one or more sensing devices, sensor data relating to an environment associated with the vehicle; determining, by a processor, at least one of a type of an intersection, a type of a traffic control device, and a signal of the traffic control device associated with an upcoming intersection based on at least one of the sensor data and map data; defining, by the processor, a first zone and a second zone of the upcoming intersection based on the at least one of the type of the intersection, the type of the traffic control device, and the signal of the traffic control device associated with an upcoming intersection; determining, by the processor, a current zone of the vehicle based on the first zone and the second zone and a position of the vehicle; and selectively controlling, by the processor, lateral movement and longitudinal movement of the vehicle based on a control method that evaluates the current zone, operator instructions, and autonomous control instructions when controlling the vehicle.

20 Claims, 8 Drawing Sheets

(56) References Cited

U.S. PATENT DOCUMENTS

| | | | |
|---|---|---|---|
| 2018/0074502 A1* | 3/2018 | Holben | B60W 30/18154 |
| 2018/0095466 A1* | 4/2018 | Allan | G05D 1/0088 |
| 2020/0310448 A1* | 10/2020 | Yamada | G05D 1/0088 |
| 2021/0053566 A1* | 2/2021 | Kobayashi | B60W 30/18154 |
| 2022/0009491 A1* | 1/2022 | Taruoka | B60W 30/18154 |
| 2022/0068124 A1* | 3/2022 | Kobashi | G08G 1/0145 |

\* cited by examiner

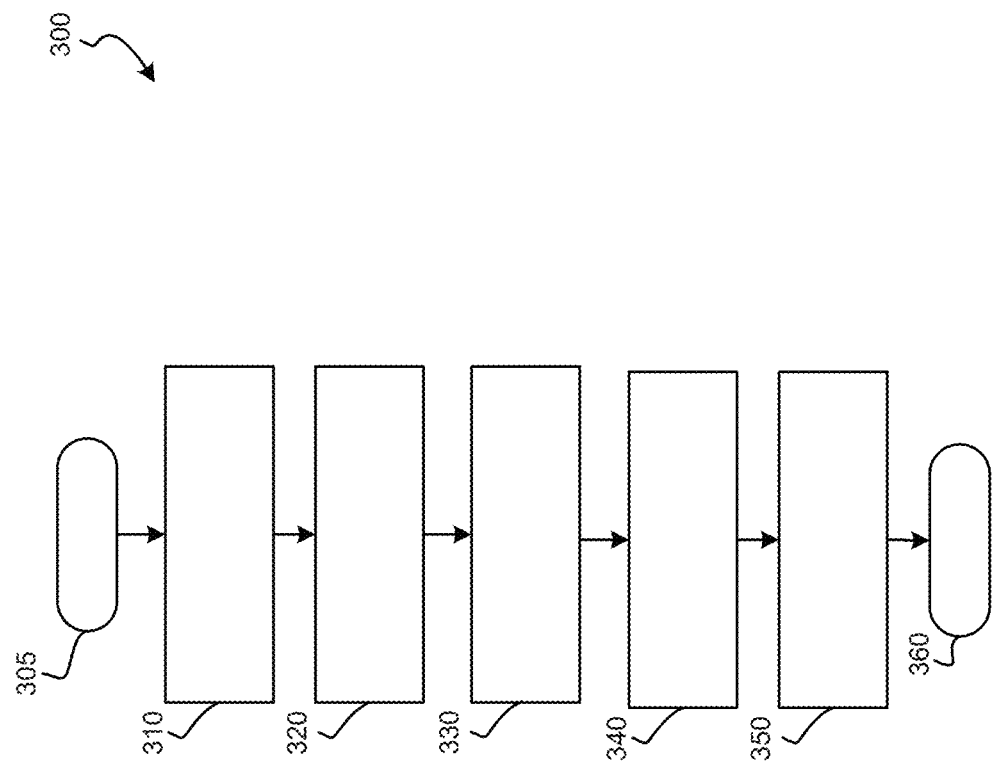

SYSTEMS AND METHODS FOR INTERSECTION MANEUVERING BY VEHICLES

TECHNICAL FIELD

The present disclosure generally relates to autonomous vehicles, and more particularly relates to systems and methods for controlling vehicle maneuvers within an intersection.

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle. While recent years have seen significant advancements in autonomous vehicles, such vehicles might still be improved in a number of respects. For example, it is not unusual for an autonomous vehicle to encounter obstacles that might occlude, to some extent, the field of view of various sensing devices that are attempting to monitor oncoming traffic. This is particularly the case in scenarios where the autonomous vehicle is stationary at an intersection with the intent of entering the flow of oncoming traffic, for example, while attempting to turn right into traffic from a minor road or alley.

Accordingly, it is desirable to provide obstacle management systems and methods for controlling vehicle maneuvers within an intersection. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: receiving, via one or more sensing devices, sensor data relating to an environment associated with the vehicle; determining, by a processor, at least one of a type of an intersection, a type of a traffic control device, and a signal of the traffic control device associated with an upcoming intersection based on at least one of the sensor data and map data; defining, by the processor, a first zone and a second zone of the upcoming intersection based on the at least one of the type of the intersection, the type of the traffic control device, and the signal of the traffic control device associated with an upcoming intersection; determining, by the processor, a current zone of the vehicle based on the first zone and the second zone and a position of the vehicle; and selectively controlling, by the processor, lateral movement and longitudinal movement of the vehicle based on a control method that evaluates the current zone, operator instructions, and autonomous control instructions when controlling the vehicle.

In various embodiments, the type of the traffic control device is determined to be at least one of a stop sign and a traffic light. In various embodiments, the signal of the traffic control device is determined to be at least one of a red signal, a green signal, a yellow signal, a yellow blinking signal, a red blinking signal, and an arrow signal.

In various embodiments, the defining the first zone comprises defining the first zone based on an area between a stop location of the vehicle and a stop line of the upcoming intersection.

In various embodiments, the defining the first zone comprises defining the first zone based on an area between a stop location of the vehicle and a boundary of the upcoming intersection constrained by a next lane segment outside of the upcoming intersection.

In various embodiments, the defining the first zone comprises defining the first zone based on an area between the stop location of the vehicle and a determined region of interest.

In various embodiments, the defining the second zone comprises defining the second zone based on an area immediately following the determined region of interest from the first zone.

In various embodiments, the defining the second zone comprises defining the second zone based on an area between immediately past a stop line of the upcoming intersection and inside the upcoming intersection and connecting a new lane segment.

In various embodiments, the defining the second zone comprises defining the second zone based on an area between immediately past a stop line of the upcoming intersection and a new lane segment outside of the upcoming intersection.

In various embodiments, the defining the second zone comprises defining the second zone based on an area including a new lane segment outside of the upcoming intersection.

In various embodiments, the operator instructions are based on at least one of an accelerator position sensor data and button input data.

In various embodiments, the method further includes generating, by the processor, display data to display zone information, traffic control device information and control status information to a driver of the vehicle.

In another embodiment, a system includes: one or more sensing devices that generate sensor data relating to an environment associated with the vehicle; and a processor, configured to: determine at least one of a type of an intersection, a type of a traffic control device, and a signal of the traffic control device associated with an upcoming intersection based on at least one of the sensor data and map data, define a first zone and a second zone of the upcoming intersection based on the at least one of the type of the intersection, the type of the traffic control device, and the signal of the traffic control device associated with an upcoming intersection, determine a current zone of the vehicle based on the first zone and the second zone and a position of the vehicle, and selectively control lateral movement and longitudinal movement of the vehicle based on a control method that evaluates the current zone, operator instructions, and autonomous control instructions when controlling the vehicle.

In various embodiments, the processor is configured to define the first zone based on an area between a stop location of the vehicle and a stop line of the upcoming intersection.

In various embodiments, the processor is configured to define the second zone based on an area between a stop location of the vehicle and a boundary of the upcoming intersection constrained by a next lane segment outside of the upcoming intersection.

In various embodiments, the processor is configured to define the second zone based on an area between immediately past a stop line of the upcoming intersection and inside the upcoming intersection and connecting new lane segment.

In various embodiments, the processor is configured to define the second zone based on an area between immediately past a stop line of the upcoming intersection and a new lane segment outside of the upcoming intersection.

In various embodiments, the processor is configured to define the second zone based on an area including a new lane segment outside of the upcoming intersection.

In various embodiments, the processor is configured to define the first zone based on an area between the stop location of the vehicle and a determined region of interest.

In various embodiments, the processor is configured to define the second zone based on an area immediately following the determined region of interest from the first zone.

DESCRIPTION OF THE DRAWINGS

The exemplary embodiments will hereinafter be described in conjunction with the following drawing figures, wherein like numerals denote like elements, and wherein:

FIG. 13 is a flowchart illustrating a control method for controlling maneuvers of the autonomous vehicle at an intersection, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
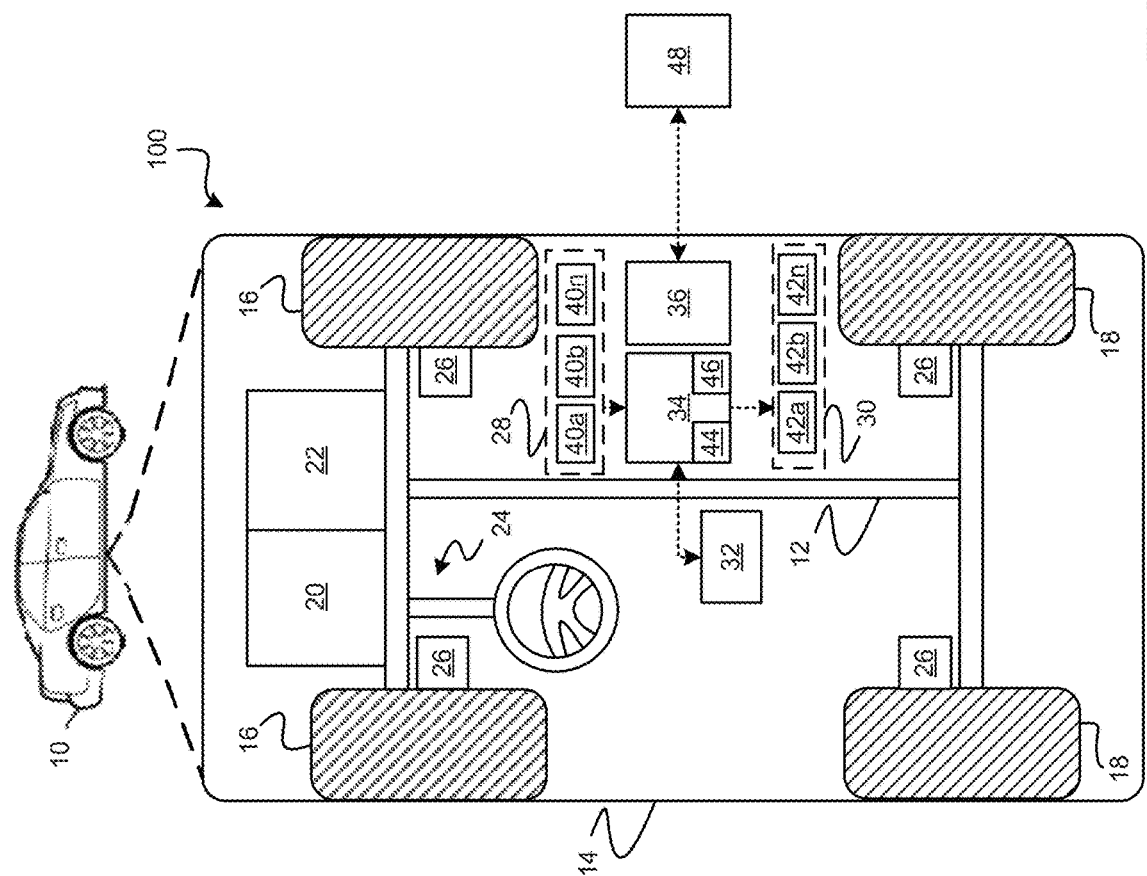
FIG. 1 is a functional block diagram illustrating an autonomous vehicle including intersection maneuver control system, in accordance with various embodiments.

With reference to FIG. 1, an intersection maneuver control system shown generally as 100 is associated with a vehicle 10 in accordance with various embodiments. In general, intersection maneuver control system (or simply "system") 100 allows for users to input longitudinal control of the vehicle 10 while the vehicle 10 maintains lateral control when maneuvering through an intersection. The intersection maneuver control system 100 allows association of the type of maneuver that is desired, the type of traffic control device the intersection has or does not have, and the status of the device within the intersection to define a "creep zone" where the vehicle 10 is controlled to allow for a blend of driver longitudinal control and autonomous lateral control. Generally speaking, the "creep zone" is a zone where driver longitudinal input is required from the driver and the system will follow with lateral control. While the vehicle 10 is traveling in this zone, any time the longitudinal input from the driver is removed, the system 100 will plan to a stop longitudinally. Once the vehicle 10 is outside of this zone, travelling in a second zone, the automated system will take over both lateral and longitudinal control fully. As can be appreciated, the term intersection refers to any intersection between drivable spaces where a stop may occur including, but not limited to, an intersection between two roads, an intersection between two road segments, an intersection between a road and a parking lot, an intersection between a road and a parking space, etc.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the intersection maneuver control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement features of the intersection maneuver control system 100 as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
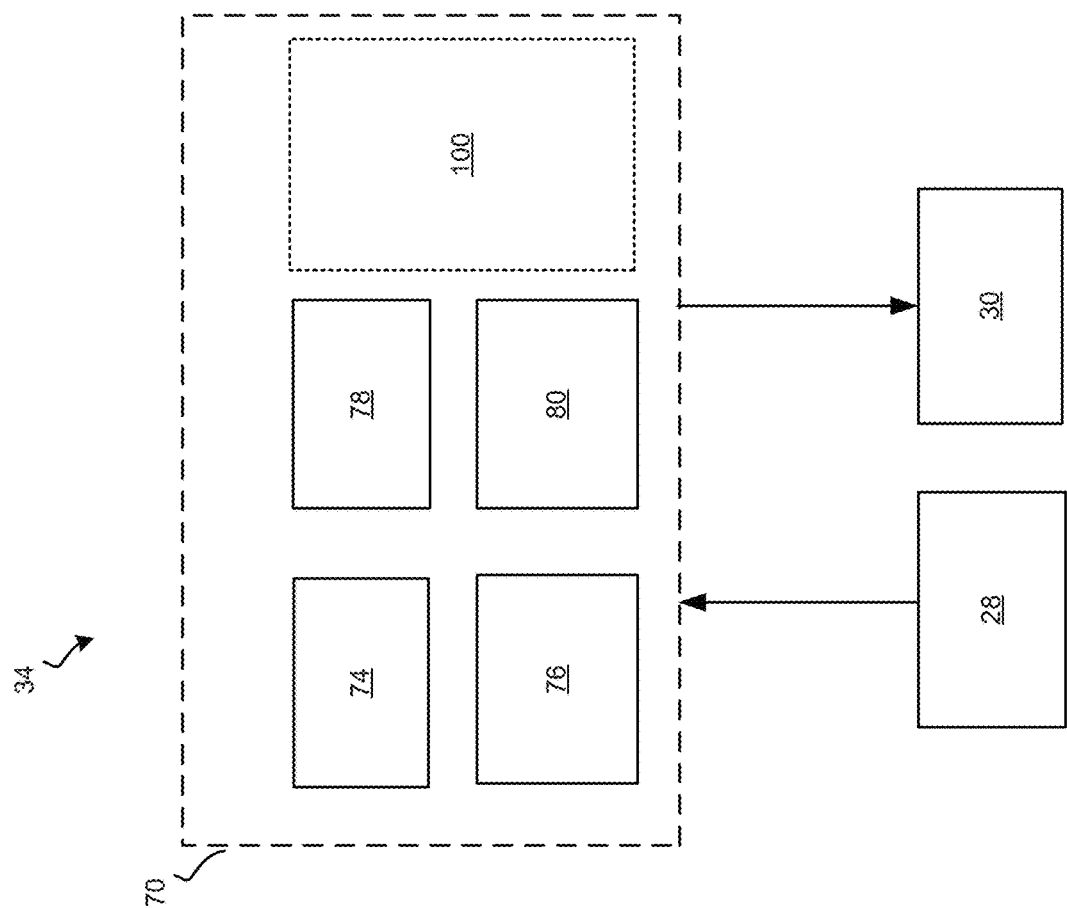
FIG. 2 is functional block diagram illustrating an autonomous driving system (ADS) associated with an autonomous vehicle, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline autonomous vehicle 10 and/or an autonomous vehicle based remote transportation system. To this end, an autonomous vehicle and autonomous vehicle based remote transportation system can be modified, enhanced, or otherwise supplemented to provide the additional features described in more detail below.

In accordance with various embodiments, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with the vehicle 10.

In various embodiments, the instructions of the autonomous driving system 70 may be organized by function or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes the acquired sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, all or parts of the intersection maneuver control system 100 may be included within or may communicate with the computer vision system 74, the positioning system 76, the guidance system 78, and/or the vehicle control system 80. As mentioned briefly above, the intersection maneuver control system 100 of FIG. 1 is configured to blend control between user control and autonomous control to perform maneuvers within an intersection of a road.

Figure 3:
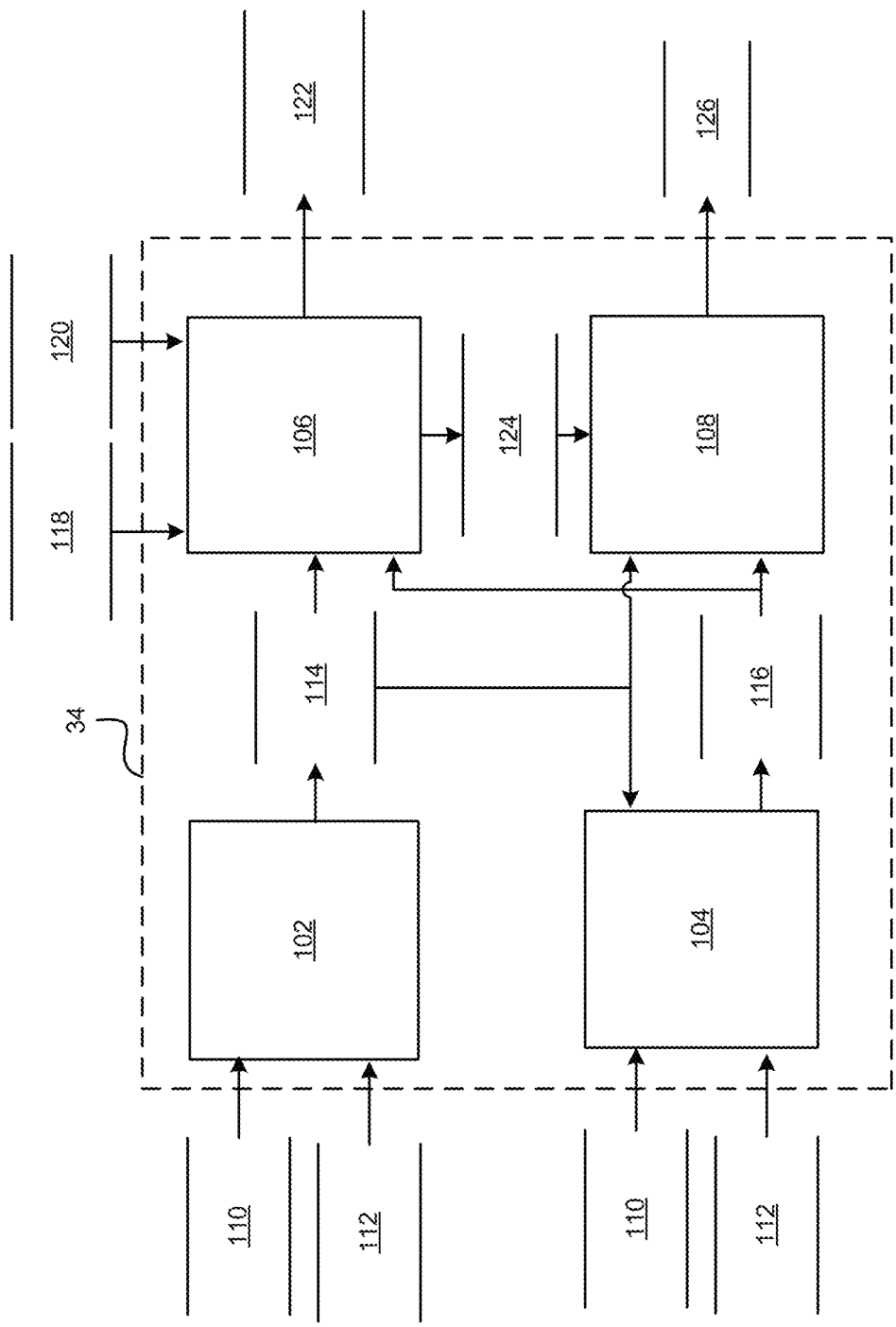
FIG. 3 is a dataflow diagram illustrating an intersection maneuver control system of an autonomous vehicle, in accordance with various embodiments.

In this regard, FIG. 3 is a dataflow diagram illustrating features of the intersection maneuver control system 100. It will be understood that various embodiments of the intersection maneuver control system 100 according to the present disclosure may include any number of sub-modules embedded within the controller 34 which may be combined and/or further partitioned to similarly implement systems and methods described herein. Furthermore, inputs to the intersection maneuver control system 100 may be received from the sensor system 28, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

The various modules described herein may be implemented as one or more machine learning models that undergo supervised, unsupervised, semi-supervised, or reinforcement learning and perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

In some embodiments, training of any machine learning models used by system 100 occurs within a system remote from the vehicle 10 and is subsequently downloaded to the vehicle 10 for use during normal operation of vehicle 10. In other embodiments, training occurs at least in part within controller 34 of vehicle 10, itself, and the model is subsequently shared with external systems and/or other vehicles in a fleet. Training data may similarly be generated by the vehicle 10 or acquired externally, and may be partitioned into training sets, validation sets, and test sets prior to training.

In various embodiments, the modules of the intersection maneuver control system 100 include an intersection determination module 102, a zone determination module 104, a vehicle control module 106, and a display control module 108 108.

In various embodiments, the intersection determination module 102 receives as input sensor data 110 from one or more sensing devices 40*a*-40*n* of the sensor system 28, and/or map data 112 stored in the data storage device 32. Based on the inputs 110, 112 the intersection determination module 102 determines a type of an upcoming intersection between two driving spaces and a type and status of a control device at the upcoming intersection, if one exists. For example, the traffic control device determination module 102 determines from the map data 112 and a current location of the vehicle 10 that an upcoming intersection is of a certain type such as, but not limited to, an intersection between two roads, an intersection between two road segments, an intersection between a road and a parking lot, an intersection between a road and a parking space, etc. and determines whether the intersection is controlled by two stop signs, four stop signs, a traffic light, etc. The traffic control device determination module 102 then confirms the type via the sensor data 110 (e.g., using image processing techniques) and determines the current signal of the traffic control device (e.g., red light, green light, yellow light, green arrow, red blinking, etc.), if on exists. The intersection determination module 102 then generates traffic control data 114 indicating the type of intersection, the type of traffic control device, and/or the current signal.

The zone determination module 104 receives as input the traffic control data 114, the sensor data 110, and/or the map data 112. The zone determination module 104 defines zones of the upcoming intersection defined by the map data 112 based on the type of intersection, the type of traffic signal, and/or the current signal of the traffic signal. For example, a first zone of the intersection is defined to include an area where the vehicle permits an operator of the vehicle to initiate longitudinal control of the vehicle. A second zone of the intersection is defined to include an area where the vehicle resumes longitudinal and lateral control of the vehicle. In various embodiments, a beginning and an ending location of each of the zones can be defined based on a current position of the vehicle, a location of a stop line at the upcoming intersection, a location of the lanes, a location of parking spaces, or any other space defining features. Exemplary zones associated with an intersection between two roads are shown in FIGS. 4-12 and will be described in more detail below. As can be appreciated other zones can be defined between other intersections and embodiments are not limited to the exemplary zones.

In various embodiments, after defining the current zones of the upcoming intersection, the zone determination module 104 generates current zone data 116 indicating a current position of the vehicle relative to the defined zones (e.g., current position is zone 1, current position is zone 2, current position is no zone, etc.).

The vehicle control module 106 receives as input desired path data 118, accelerator position data 120, the traffic control data 114, and the current zone data 116. The desired path data 118 indicates a desired lateral and longitudinal path of the vehicle 10 through the intersection. The accelerator position data 120 indicates a position of a pedal or input button depressed by an operator of the vehicle 10. The vehicle control module 106 selects a blended control method (i.e., a method that blends control between the ADS 70 and the operator) based on the traffic control data 114. For example, when the traffic control data 114 indicates that the upcoming intersection is controlled by two stop signs, a first control method is selected; when the traffic control data 114 indicates that the intersection is controlled by four stop signs, a second control method is selected; and when the traffic control data 114 indicates that the intersection is controlled by a traffic light, a third control method is selected, and so on.

Figure 4:
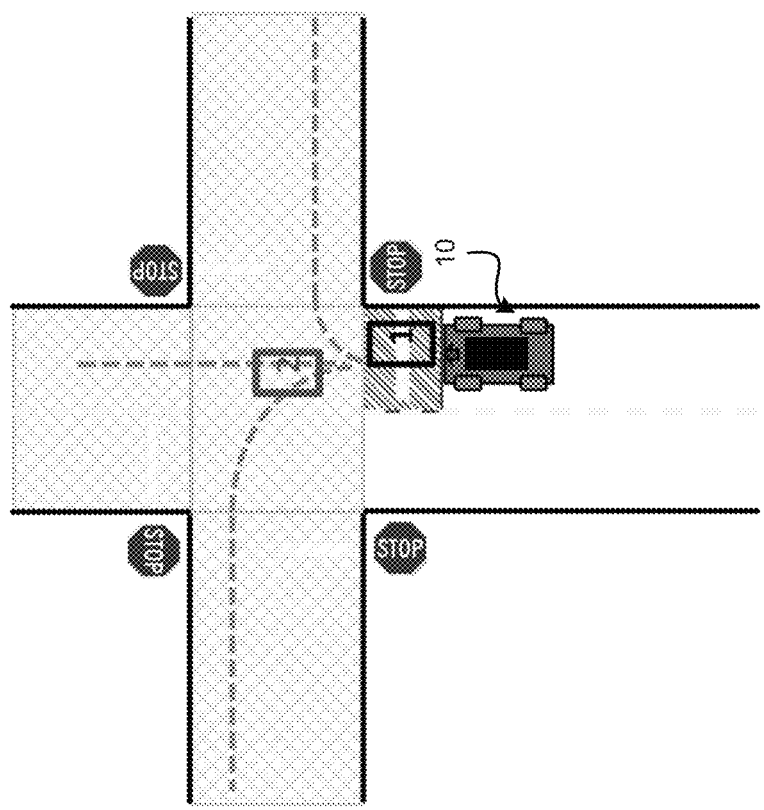
FIGS. 4-12 are top-down views of exemplary scenarios of a vehicle entering traffic flow of intersections, in accordance with various embodiments.
Figure 5:
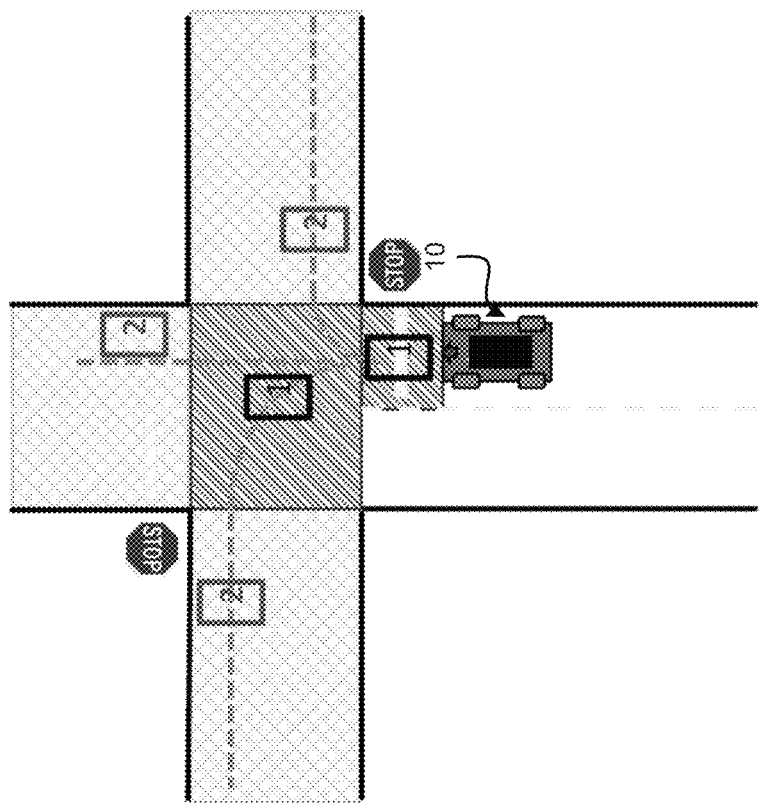

In various embodiments, each of the control methods, when performed by the vehicle control module 106, generate vehicle control data 122 to control the vehicle 10. The control methods evaluate the desired path data 118, the accelerator position data 120, the current traffic signal indicated by the traffic control data 114, and the current zone data 116 in order to generate the vehicle control data 122. For example, FIGS. 4-12 present top-down views of example scenarios useful in understanding the various control methods. More particularly, FIGS. 4 and 5 illustrate scenarios where stop signs control an intersection; and FIGS. 6-12 illustrate scenarios where a traffic light controls the intersection.

In FIG. 4, the vehicle 10 is stopped or substantially stationary within a lane at an intersection controlled by two stop signs, as shown. The desired path data 118 indicates that the desired path of the vehicle 10 (straight path, left turn path, or right turn path) requires entering the flow of oncoming traffic. The oncoming traffic is not controlled by a stop sign. Zone 1 is defined by the zone determination module 104 as the area from the location where the vehicle 10 has stopped to the boundary of the intersection constrained by the next lane segment outside of the intersection. Zone 2 is defined by the zone determination module 104 as the area including the new lane segment outside of the intersection.

In FIG. 5, the vehicle is 10 is stopped or substantially stationary within a lane at an intersection controlled by four stop signs, as shown. The desired path data 118 indicates that the desired path of the vehicle 10 (straight path, left turn path, or right turn path) requires entering a new lane. The oncoming traffic is regulated by stop signs. Zone 1 is defined by the zone determination module 104 as the area from the location where the vehicle has stopped to the nearest lane overlap lane edge within the intersection. Zone 2 is defined by the zone determination module 104 as the area inside the intersection and the new lane segments.

In each of these scenarios, the traffic control device determination module 102 detects that the intersection is controlled by stop signs (e.g., either two or four). The vehicle control module 106 detects that that the vehicle 10 is stopped at X meters from the stop line. The vehicle control module 106 controls the vehicle 10 to remain stopped with a turn signal on as needed for the maneuver. When the driver presses the accelerator to up to Y % for Z milliseconds to initiate motion forward, the vehicle control module 106 detects the operator instructions via the accelerator position data 120 and controls the vehicle 10 forward along the desired path according to the operator instructions. If the accelerator position data 120 indicates that driver releases the pedal at any time while the current zone data 116 indicates zone 1, the vehicle control module 106 detects the operator instructions and stops the vehicle 10. While the operator instructions are used to control the vehicle 10 in a forward direction, the vehicle control module 106 controls the vehicle laterally according to the desired path.

Once the current zone data 116 indicates that the vehicle 10 has entered zone 2, the vehicle control module 106 takes over the longitudinal control. For example, if the desired speed is greater than the speed indicated by the operator instructions, the vehicle control module 106 commands the greater speed and continues to control the speed.

Figure 6:
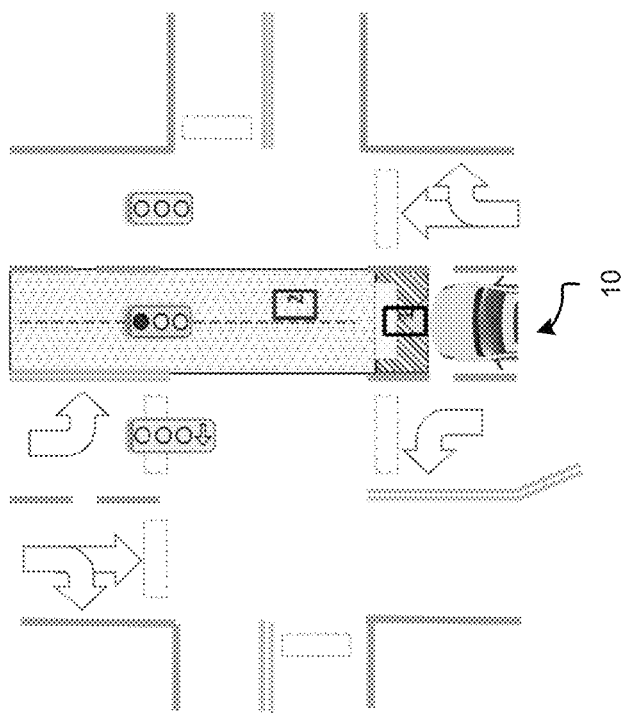

In FIG. 6, the vehicle 10 is stopped or substantially stationary within a lane at an intersection controlled by one or more stop lights, as shown. The desired path of the vehicle 10 is a straight path. The traffic light is detected as indicating a red light. Zone 1 is defined by the zone determination module 104 as the area from the location where the vehicle 10 has stopped and the stop line. Zone 2 is defined by the zone determination module 104 as the area immediately past the stop line and inside the intersection and connecting the new lane segment.

In this scenario, the traffic control device determination module 102 detects that the intersection is controlled by the traffic signal and detects the color of the signal. The vehicle 10 is stopped at X meters from the stop line and the vehicle control module 106 controls the vehicle 10 to remain stopped. When the driver presses the accelerator pedal to up to Y % for Z milliseconds to initiate motion forward, the vehicle control module 106 detects the operator instructions via the accelerator position data 120 and controls the vehicle 10 forward along the desired path according to the operator instructions. If the driver releases the pedal at any time while the current zone data 116 indicates zone 1, the vehicle control module 106 detects the operator instructions and stops the vehicle 10. While the operator instructions are used to control the vehicle 10 in a forward direction, the vehicle control module 106 controls the vehicle 10 laterally according to the desired path.

Once the current zone data 116 indicates that the vehicle 10 has entered zone 2, and the light status is RED, the vehicle control module 106 escalates control back to the driver and if the driver releases the pedal at any point inside the zone 2, the vehicle control module 106 plans a stop.

Figure 7:
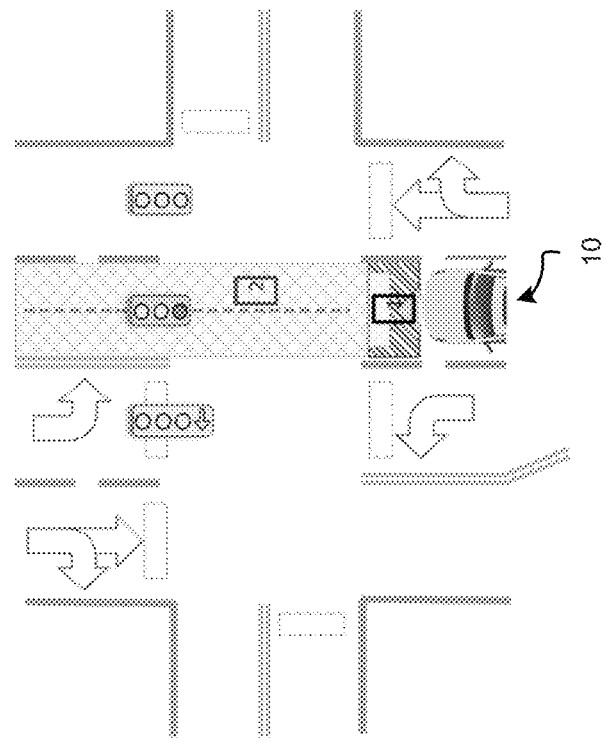

In FIG. 7, the vehicle 10 is stopped or substantially stationary within a lane at an intersection controlled by one or more stop lights, as shown. The intended path of the vehicle 10 is a straight path. The traffic light has changed from a red light to a green light. Zone 1 is defined by the zone determination module 104 as the area from the location where the vehicle 10 has stopped and the stop line. Zone 2 is defined by the zone determination module 104 as the area immediately past the stop line and inside the intersection and connecting the new lane segment.

In this scenario, the traffic control device determination module 102 detects that the intersection is controlled by the traffic signal and detects the color of the signal. The vehicle 10 is stopped at X meters from the stop line and the vehicle control module 106 controls the vehicle to remain stopped. When the driver presses the accelerator pedal to up to Y % for Z milliseconds to initiate motion forward, the vehicle control module 106 detects the operator instructions via the accelerator position data 120 and controls the vehicle 10 forward along a desired path according to the operator instructions. If the driver releases the pedal at any time while the current zone data indicates zone 1, the vehicle control module 106 detects the operator instructions and stops the vehicle 10. While the operator instructions are used to control the vehicle 10 in a forward direction, the vehicle control module 106 controls the vehicle 10 laterally according to the desired path.

If the system detects that the light has changed to green while still in zone 1, and when the driver presses the accelerator pedal to up to Y % for Z milliseconds to initiate motion forward, the system 100 detects the operator instructions and controls the vehicle 10 forward along a desired path according to the operator instructions.

Once current zone data 116 indicates that the vehicle 10 has entered zone 2, the vehicle control module 106s takes over the longitudinal control of the vehicle 10 and will continue the control unless the driver takes over. For example, if the driver releases the pedal at any time within the intersection, the vehicle control module 106 controls the vehicle 10 to a stop immediately along the desired path.

Figure 8:
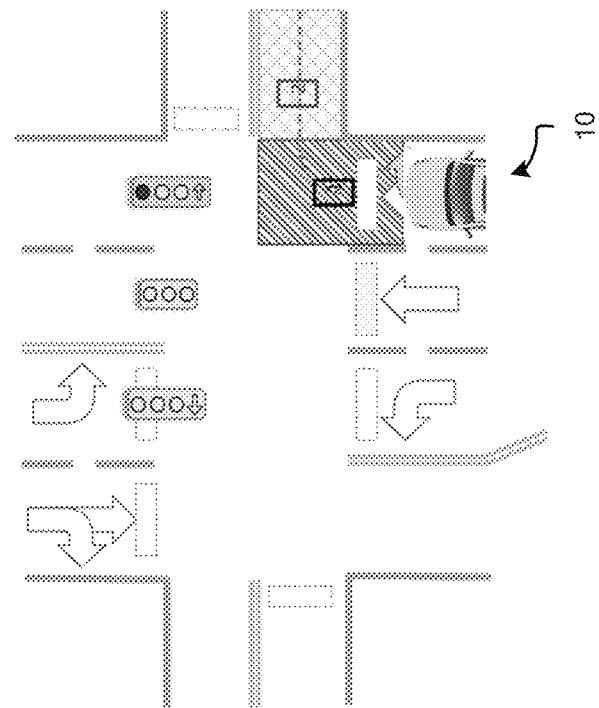

In FIG. 8, the vehicle 10 is stopped or substantially stationary within a lane at an intersection controlled by one or more stop lights, as shown. The intended path of the vehicle 10 is a right turn path and requires entering the flow of oncoming traffic. The oncoming traffic is controlled by the traffic light. The traffic light indicates a red light. Zone 1 is defined by the zone determination module 104 as the area from the location where the vehicle has stopped and the boundary of the intersection constrained by the next lane segment outside of the intersection. Zone 2 is defined by the zone determination module 104 as the area from the new lane segment outside of the intersection.

The traffic control device determination module 102 detects that the intersection is controlled by the traffic signal and detects the color of the signal. The traffic control device determination module 102 detects that the intersection is controlled by the traffic signal and detects the color of the signal. The vehicle 10 is stopped at X meters from the stop line and the vehicle control module 106 controls the vehicle 10 to remain stopped. When the driver presses the accelerator pedal to up to Y % for Z milliseconds to initiate motion forward, the vehicle control module 106 detects the operator instructions and controls the vehicle 10 forward along a desired path according to the operator instructions. If the driver releases the pedal at any time while the current zone data 116 indicates zone 1, the vehicle control module 106 detects the operator instructions and stops the vehicle 10. While the operator instructions are used to control the vehicle 10 in a forward direction, the vehicle control module 106 controls the vehicle 10 laterally according to the desired path.

Once the current zone data 116 indicates that the vehicle 10 has entered zone 2, the vehicle control module 106 takes over the longitudinal control. For example, if the desired speed is greater than the speed indicated by the operator instructions, the vehicle control module 106 commands the greater speed and continues to control the speed.

Figure 9:
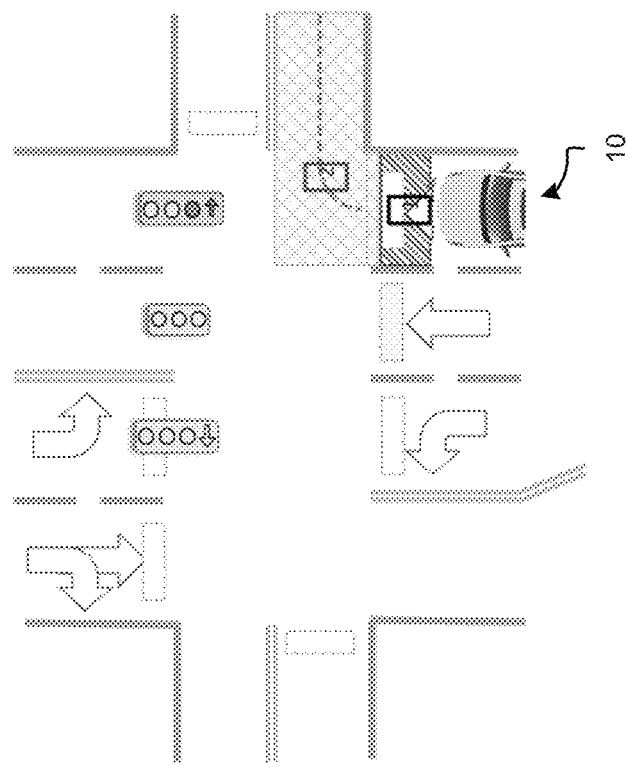

In FIG. 9, the vehicle 10 is stopped or substantially stationary within a lane at an intersection controlled by one or more stop lights, as shown. The intended path of the vehicle 10 is a right turn path and requires entering the flow of oncoming traffic. The oncoming traffic is controlled by the traffic light. The traffic light has changed from a red light to a green light. Zone 1 is defined by the zone determination module 104 as the area from the location where the vehicle 10 has stopped and the stop line. Zone 2 is defined by the zone determination module 104 as the area from immediately past the stop line and the area inside the intersection and connecting new lane segment.

In this scenario, the traffic control device determination module 102 detects that the intersection is controlled by the traffic signal and detects the color of the signal. The traffic control device determination module 102 detects that the intersection is controlled by the traffic signal and detects the color of the signal. The vehicle is stopped at X meters from the stop line and the vehicle control module 106 controls the vehicle 10 to remain stopped. When the driver presses the accelerator pedal to up to Y % for Z milliseconds to initiate motion forward, the vehicle control module 106 detects the operator instructions and controls the vehicle 10 forward along a desired path according to the operator instructions. If the driver releases the pedal at any time while the current zone data 116 indicates zone 1, the vehicle control module 106 detects the operator instructions and stops the vehicle 10. While the operator instructions are used to control the vehicle 10 in a forward direction, the vehicle control module 106 controls the vehicle 10 laterally according to the desired path.

If the traffic control device determination module 102 detects that the light has changed to green while the zone determination module 104 determines the vehicle 10 is still in zone 1, and operator instructions indicate that the driver presses the accelerator pedal to up to Y % for Z milliseconds to initiate motion forward, the vehicle control module 106 detects the operator instructions and controls the vehicle 10 forward along a desired path according to the operator instructions.

Once current zone data 116 indicates that the vehicle 10 has entered zone 2, the vehicle control module 106 takes over the longitudinal control of the vehicle 10 and continues to control the vehicle 10 unless the driver takes over. For example, if the driver releases the pedal at any time within the intersection, and the control speed is greater than the driver commanded speed, the vehicle control module 106 overtakes the driver command for longitudinal control.

Figure 10:
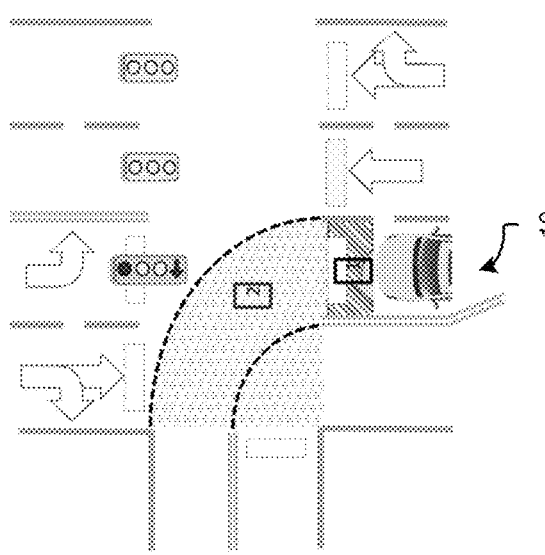

In FIG. 10, the vehicle 10 is stopped or substantially stationary within a lane at an intersection controlled by one or more stop lights, as shown. The intended path of the vehicle 10 is a left turn path and requires entering the flow of oncoming traffic. The oncoming traffic is controlled by the traffic light. The traffic light is a red light. Zone 1 is defined by the zone determination module 104 as the area from the location where the vehicle 10 has stopped and the stop line. Zone 2 is defined by the zone determination module 104 as the area from immediately past the stop line and the area inside the intersection and connecting new lane segment.

The traffic control device determination module 102 detects that the intersection is controlled by the traffic signal and detects the color of the signal. The traffic control device determination module 102 detects that the intersection is controlled by the traffic signal and detects the color of the signal. The vehicle is stopped at X meters from the stop line and the vehicle control module 106 controls the vehicle 10 to remain stopped. When the driver presses the accelerator pedal to up to Y % for Z milliseconds to initiate motion forward, the vehicle control module 106 detects the operator instructions and controls the vehicle 10 forward along a desired path according to the operator instructions. If the driver releases the pedal at any time while the current zone data 116 indicates zone 1, the vehicle control module 106 detects the operator instructions and stops the vehicle 10. While the operator instructions are used to control the vehicle 10 in a forward direction, the vehicle control module 106 controls the vehicle 10 laterally according to the desired path.

Once the current zone data 116 indicates that the vehicle 10 has entered zone 2, and the light status is RED, the vehicle control module 106 escalates control back to the driver and if the driver releases the pedal at any point inside the zone 2, the vehicle control module 106 plans a stop.

Figure 11:
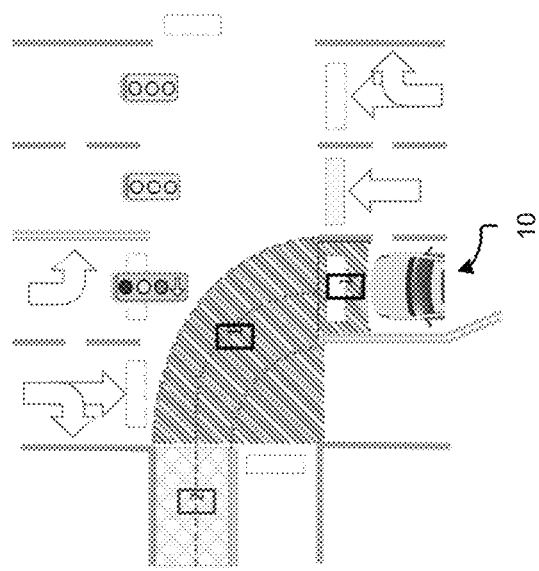

In FIG. 11, the vehicle 10 is stopped or substantially stationary within a lane at an intersection controlled by one or more stop lights, as shown. The intended path of the vehicle 10 is a left turn path and requires entering the flow of oncoming traffic. The oncoming traffic is controlled by the traffic light. The traffic light is a red blinking light or permissive turn signal. Zone 1 is defined by the zone determination module 104 as the area from the location where the vehicle 10 has stopped and the boundary of the intersection constrained by the next lane segment outside of the intersection. Zone 2 is defined by the zone determination module 104 as the area from the new lane segment outside of the intersection.

In this scenario, the traffic control device determination module 102 detects that the intersection is controlled by the traffic signal and detects the color of the signal. The traffic control device determination module 102 detects that the intersection is controlled by the traffic signal and detects the color of the signal. The vehicle 10 is stopped at X meters from the stop line and the vehicle control module 106 controls the vehicle 10 to remain stopped. When the driver presses the accelerator pedal to up to Y % for Z milliseconds to initiate motion forward, the vehicle control module 106 detects the operator instructions and controls the vehicle 10 forward along a desired path according to the operator instructions. If the driver releases the pedal at any time while the current zone data 116 indicates zone 1, the vehicle control module 106 detects the operator instructions and stops the vehicle 10. While the operator instructions are used to control the vehicle 10 in a forward direction, the vehicle control module 106 controls the vehicle 10 laterally according to the desired path.

If the traffic control device determination module 102 detects that the light has changed to green while the zone determination module 104 determines the vehicle is still in zone 1, and operator instructions indicate that the driver presses the accelerator pedal to up to Y % for Z milliseconds to initiate motion forward, the vehicle control module 106 detects the operator instructions and controls the vehicle 10 forward along a desired path according to the operator instructions.

Once the current zone data 116 indicates that the vehicle 10 has entered zone 2, the vehicle control module 106 takes over the longitudinal control. For example, if the desired speed is greater than the speed indicated by the operator instructions, the vehicle control module 106 commands the greater speed and continues to control the speed.

Figure 12:
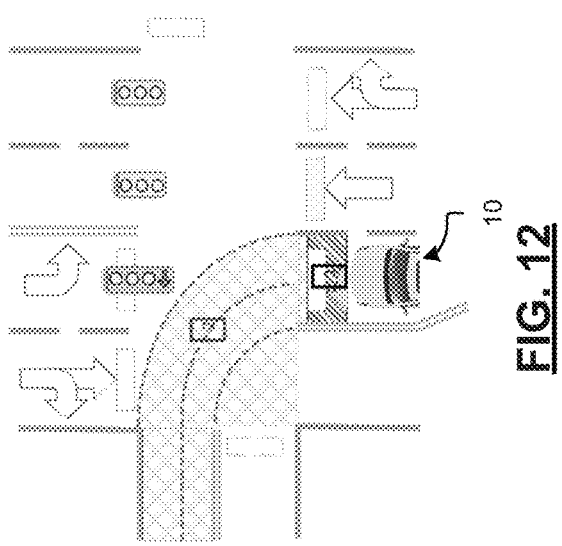

In FIG. 12, the vehicle 10 is stopped or substantially stationary within a lane at an intersection controlled by one or more stop lights, as shown. The intended path of the vehicle 10 is a left turn path and requires entering the flow of oncoming traffic. The oncoming traffic is controlled by the traffic light. The traffic light is a green light/arrow or protected turn signal. Zone 1 is identified as the location from where the vehicle 10 has stopped and the stop line. Zone 2 is identified as the area between immediately past the stop line and inside the intersection and connecting new lane segment.

In this scenario, the traffic control device determination module 102 detects that the intersection is controlled by the traffic signal and detects the color of the signal. The traffic control device determination module 102 detects that the intersection is controlled by the traffic signal and detects the color of the signal. The vehicle 10 is stopped at X meters from the stop line and the vehicle control module 106 controls the vehicle 10 to remain stopped. When the driver presses the accelerator pedal to up to Y % for Z milliseconds to initiate motion forward, the vehicle control module 106 detects the operator instructions and controls the vehicle 10 forward along a desired path according to the operator instructions. If the driver releases the pedal at any time while the current zone data 116 indicates zone 1, the vehicle control module 106 detects the operator instructions and stops the vehicle 10. While the operator instructions are used to control the vehicle 10 in a forward direction, the vehicle control module 106 controls the vehicle 10 laterally according to the desired path.

Once the current zone data 116 indicates that the vehicle 10 has entered zone 2, the vehicle control module 106 takes over the longitudinal control. For example, if the desired speed is greater than the speed indicated by the operator instructions, the vehicle control module 106 commands the greater speed and continues to control the speed.

With reference back to FIG. 3, the display control module 108 receives as input the current zone data 116, the traffic control data 114, and the vehicle control status data 124. Based on the inputs, the display control module 108 generates display data 126 to display zone information, traffic control device information and control status information to the driver of the vehicle 10. For example, colors, shading, highlighting, shading, etc. of vehicle components, roadway components, and/or desired paths can be modified based on the received data. In various embodiments, a separate icon can be displayed to indicate when driver intervention is or is not permitted.

Referring now to FIG. 13, and with continued reference to FIGS. 1-12, the illustrated flowchart provides a control method 300 that can be performed by the system 100 in accordance with the present disclosure. As will be appreciated in light of the present disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of the vehicle 10.

In various embodiments, the method 300 begins at 305. Sensor data 110 and map data 112 relating to the environment associated with the vehicle 10 is received at 310. As detailed above, this sensor data 110 might be received from a variety of sensing devices 40a-40n, such as optical cameras, lidar sensors, radar sensors, etc. At 320, this sensor data 110 is then used with the map data 112 to determine traffic control data 114 for an upcoming intersection. The sensor data 110 is then used with the map data 112 to determine current zone data 116 including zones associated with the upcoming intersection and a current position with respect to the determined zones at 330.

Thereafter, at 340 the traffic control data 114 and the current zone data 116 is used with the desired path data 118, and accelerator position data 120, to control the vehicle 10 according to a selected control method, for example, as discussed above. The display data 126 is generated to display a status of the control at 350. Thereafter, the method may end at 360.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling an autonomous vehicle, comprising:
   receiving, via one or more sensing devices, sensor data relating to an environment associated with the vehicle;
   determining, by a processor, a type of an intersection, and a type of a traffic control device associated with an upcoming intersection based on at least one of the sensor data and map data;
   defining, by the processor, a first zone and a second zone of the upcoming intersection based on a map of the upcoming intersection associated with the type of the intersection and the type of the traffic control device and based on a current stop location of the vehicle;
   determining, by the processor, a current zone of the vehicle to be at least one of the first zone, the second zone, and no zone based on a position of the vehicle; and
   selectively controlling, by the processor, lateral movement and longitudinal movement of the vehicle based on a control method that evaluates the current zone, operator instructions, and autonomous control instructions when controlling the vehicle.

2. The method of claim 1, wherein the type of the traffic control device is determined to be at least one of a stop sign and a traffic light.

3. The method of claim 1, wherein the defining the first zone comprises defining the first zone based on an area between the current stop location of the vehicle and a stop line of the upcoming intersection.

4. The method of claim 1, wherein the defining the first zone comprises defining the first zone based on an area between the current stop location of the vehicle and a boundary of the upcoming intersection constrained by a next lane segment outside of the upcoming intersection.

5. The method of claim 1, wherein the defining the first zone comprises defining the first zone based on an area between the current stop location of the vehicle and a determined region of interest.

6. The method of claim 5, wherein the defining the second zone comprises defining the second zone based on an area immediately following the determined region of interest from the first zone.

7. The method of claim 1, wherein the defining the second zone comprises defining the second zone based on an area between immediately past a stop line of the upcoming intersection and inside the upcoming intersection and connecting a new lane segment.

8. The method of claim 1, wherein the defining the second zone comprises defining the second zone based on an area between immediately past a stop line of the upcoming intersection and a new lane segment outside of the upcoming intersection.

9. The method of claim 1, wherein the defining the second zone comprises defining the second zone based on an area including a new lane segment outside of the upcoming intersection.

10. The method of claim 1, further comprising generating, by the processor, display data to display zone information, traffic control device information and control status information to a driver of the vehicle.

11. The method of claim 1, wherein the selectively controlling comprises controlling the vehicle based on a blend of driver longitudinal control and autonomous lateral control when the current zone is the first zone; and controlling the vehicle based on autonomous lateral control and autonomous longitudinal control when the current zone is the second zone.

12. A system for controlling a vehicle, comprising:
   one or more sensing devices that generate sensor data relating to an environment associated with the vehicle; and
   a processor, configured to: determine a type of an intersection, and a type of a traffic control device associated with an upcoming intersection based on at least one of the sensor data and map data, define a first zone and a second zone of the upcoming intersection based on a map of the upcoming intersection associated with the type of the intersection and the type of the traffic control device and based on a stop location of the vehicle, determine a current zone of the vehicle to be at least one of the first zone, the second zone, and no zone based on a position of the vehicle, and selectively control lateral movement and longitudinal movement of the vehicle based on a control method that evaluates the current zone, operator instructions, and autonomous control instructions when controlling the vehicle.

13. The system of claim 12, wherein the processor is configured to define the first zone based on an area between the stop location of the vehicle and a stop line of the upcoming intersection.

14. The system of claim 12, wherein the processor is configured to define the second zone based on an area between the current stop location of the vehicle and a boundary of the upcoming intersection constrained by a next lane segment outside of the upcoming intersection.

15. The system of claim 12, wherein the processor is configured to define the second zone based on an area between immediately past a stop line of the upcoming intersection and inside the upcoming intersection and connecting new lane segment.

16. The system of claim 12, wherein the processor is configured to define the second zone based on an area between immediately past a stop line of the upcoming intersection and a new lane segment outside of the upcoming intersection.

17. The system of claim 12, wherein the processor is configured to define the second zone based on an area including a new lane segment outside of the upcoming intersection.

18. The system of claim 12, wherein the processor is configured to define the first zone based on an area between the current stop location of the vehicle and a determined region of interest.

19. The system of claim 18, wherein the processor is configured to define the second zone based on an area immediately following the determined region of interest from the first zone.

20. The system of claim 12, wherein the processor is configured to selectively control movement of the vehicle by controlling the vehicle based on a blend of driver longitudinal control and autonomous lateral control when the current zone is the first zone; and controlling the vehicle based on autonomous lateral control and autonomous longitudinal control when the current zone is the second zone.

* * * * *